(12) United States Patent
Gambella et al.

(10) Patent No.: US 11,488,474 B2
(45) Date of Patent: Nov. 1, 2022

(54) IDENTIFYING AVAILABLE PARKING AREAS

(71) Applicant: International Business Machines Corporation, Armonk, NY (US)

(72) Inventors: Claudio Gambella, Dublin (IE); Anton Dekusar, Dublin (IE); Rodrigo Hernan Ordonez-Hurtado, Kildare (IE); Yassine Lassoued, Dublin (IE); Julien Monteil, Dublin (IE); Sergio Cabrero Barros, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 17/030,541

(22) Filed: Sep. 24, 2020

(65) Prior Publication Data
US 2022/0092979 A1   Mar. 24, 2022

(51) Int. Cl.
G08G 1/14 (2006.01)
G16Y 40/10 (2020.01)
G16Y 40/20 (2020.01)
G16Y 10/40 (2020.01)

(52) U.S. Cl.
CPC .............. *G08G 1/141* (2013.01); *G16Y 10/40* (2020.01); *G16Y 40/10* (2020.01); *G16Y 40/20* (2020.01)

(58) Field of Classification Search
None
See application file for complete search history.

(56) References Cited

U.S. PATENT DOCUMENTS

| | | | |
|---|---|---|---|
| 6,865,539 B1 | 3/2005 | Pugliese, III | |
| 7,333,887 B2 | 2/2008 | Baiada | |
| 8,791,838 B2 | 7/2014 | Scofield | |
| 9,459,108 B2 | 10/2016 | Berlingerio | |
| 2003/0144890 A1 | 7/2003 | Dan | |
| 2005/0125284 A1 | 6/2005 | Fairbaugh | |
| 2008/0291054 A1 | 11/2008 | Groft | |
| 2011/0106425 A1* | 5/2011 | Trum | G08G 1/09675 701/533 |
| 2011/0127944 A1 | 6/2011 | Saito | |
| 2012/0326893 A1 | 12/2012 | Glezerman | |

(Continued)

FOREIGN PATENT DOCUMENTS

CN  105976041 B  * 7/2021  ............. G06Q 10/02
EP  046897 B1  11/2001
(Continued)

OTHER PUBLICATIONS

"Parking place demand and offer assignment", printed Jun. 16, 2020, 11 pages.
(Continued)

*Primary Examiner* — Chris Parry
*Assistant Examiner* — Abderrahmen Chouat
(74) *Attorney, Agent, or Firm* — David B. Woycechowsky

(57) ABSTRACT

Generating parking area statistics for identifying parking areas within a geographic region. Navigation support for reaching a top-ranked parking area according to collected parking area data, user preferences, parking feedback, and real-time traffic conditions. Selection of a top-ranked parking area and monitoring progress during a parking event improve future identification and ranking of parking areas.

9 Claims, 6 Drawing Sheets

(56) References Cited

U.S. PATENT DOCUMENTS

| | | | |
|---|---|---|---|
| 2013/0265174 A1* | 10/2013 | Scofield | G08G 1/146 340/932.2 |
| 2014/0122190 A1 | 5/2014 | Wolfson | |
| 2014/0139359 A1 | 5/2014 | Paul | |
| 2014/0149153 A1 | 5/2014 | Cassandras | |
| 2014/0176348 A1 | 6/2014 | Acker, Jr. | |
| 2016/0300489 A1 | 10/2016 | Shafran | |
| 2017/0061508 A1* | 3/2017 | Sen | G08G 1/144 |
| 2017/0118307 A1 | 4/2017 | Beaurepaire | |
| 2017/0191849 A1 | 7/2017 | Agam | |
| 2018/0218604 A1* | 8/2018 | Astigarraga | G08G 1/0962 |
| 2020/0011671 A1 | 1/2020 | Puri | |
| 2021/0074159 A1* | 3/2021 | Seo | G08G 1/143 |

FOREIGN PATENT DOCUMENTS

| | | |
|---|---|---|
| EP | 1201849 A2 | 5/2002 |
| EP | 2315191 A1 | 4/2011 |
| KR | 101045690 B1 | 7/2011 |
| WO | 2011061028 A1 | 5/2011 |

OTHER PUBLICATIONS

Abidi et al., "A New Heuristic for Solving the Parking Assignment Problem", 19th International Conference on Knowledge Based and Intelligent Information and Engineering Systems, Procedia Computer Science 60 ( 2015 ) 312-321, 10 pages.

Ayala et al., "Parking Slot Assignment Games*", ACM SIGSPATIAL GIS '11, Nov. 1-4, 2011, Chicago, IL, USA, Copyright 2011 ACM ISBN 978-1-4503-1031—Apr. 11, 2011, 10 pages.

Botea et al., "Chapter 16—Docit: an integrated system for risk-averse multimodal journey advising", ScienceDirect, Abstract Only, Copyright © 2016 Elsevier Inc., 1 page.

Botea et al., "Multi-Modal Journey Planning in the Presence of Uncertainty", Proceedings of the Twenty-Third International Conference on Automated Planning and Scheduling, Copyright © 2013, Association for the Advancement of Artificial Intelligence, 9 pages.

Botea, Adi, "Hedging the Risk of Delays in Multimodal Journey Planning", AI in Industry, Copyright © 2016, Association for the Advancement of Artificial Intelligence, ISSN 0738-4602, Winter 2016, 2 pages.

Chaniotakis, Emmanouil, "Parking Behavioural and Assignment Modeling", Methodology and application for the evaluation of Smart Parking applications, Master of Science Thesis, May 3, 2014, 166 pages.

Griggs et al., "On the Design of Campus Parking Systems with QoS guarantees*", arXiv:1506.02818v1 [math.OC] Jun. 9, 2015, 20 pages.

Hakeem et al., "On-The-Fly Curbside Parking Assignment", Department of Computer Science, New Jersey Institute of Technology, Newark, NJ 07102, USA, 10 pages.

Lin, Trista Shuenying, "Smart parking: Network, infrastructure and urban service", HAL, Submitted on Sep. 19, 2016, 140 pages.

Liu et al., "A Distributed Markovian Parking Assist System", IEEE Transactions on Intelligent Transportation Systems, vol. 20, No. 6, Jun. 2019, 11 pages.

Piovesean et al., "Data Analytics for Smart Parking Applications", Sensors 2016, 16, 1575,doi:10.3390/s16101575, MDPI, Published: Sep. 23, 2016, 25 pages.

Rajabioun et al., "On-Street and Off-Street Parking Availability Prediction Using Multivariate Spatiotemporal Models", IEEE Transactions on Intelligent Transportation Systems, vol. 16, No. 5, Oct. 2015, 12 pages.

Shin et al., "A study on smart parking guidance algorithm", ScienceDirect, Abstract Only, printed on Jun. 15, 2020, 1 page.

Taheri et al., "A Fair Assignment of Drivers to Parking Lots", © 2017 IEEE, 8 pages.

Zhao et al., "An Algorithm of Parking Planning for Smart Parking System", arXiv:1708.07932v1 [cs.DS], Aug. 26, 2017, 5 pages.

* cited by examiner

US 11,488,474 B2

IDENTIFYING AVAILABLE PARKING AREAS

BACKGROUND

The present invention relates generally to the field of smarter cities, and more particularly to vehicle traffic.

The Internet of Things (IoT) can be described as a system of interrelated computing devices, including mechanical and digital machines, provided with unique identifiers (UIDs). These computing devices have the ability to transfer data over a network without requiring any human-to-human or human-to-computer communication or interaction. The formal definition of the IoT has evolved over time due to the convergence of multiple technologies, real-time analytics, machine learning, commodity sensors, and embedded systems. Elements that contribute to enabling the IoT include but are not limited to: (i) traditional fields of embedded systems; (ii) wireless sensor networks; (iii) control systems; and/or (iv) home and building automation.

SUMMARY

According to an aspect of the present invention, there is a method, computer program product and/or system that performs the following operations (not necessarily in the following order): (i) generating parking area statistics for a geographic region; (ii) receiving a request for an available parking area to park a vehicle; (iii) identifying a set of available parking areas within the geographic area based on parking area data collected from a set of internet of things (IoT) devices operating various parking areas and parking area statistics; (iv) selecting a top-ranked parking area from the set of available parking areas based user preferences; and (v) presenting the top-ranked parking area in response to the requested available parking area.

DETAILED DESCRIPTION

Figure 1:
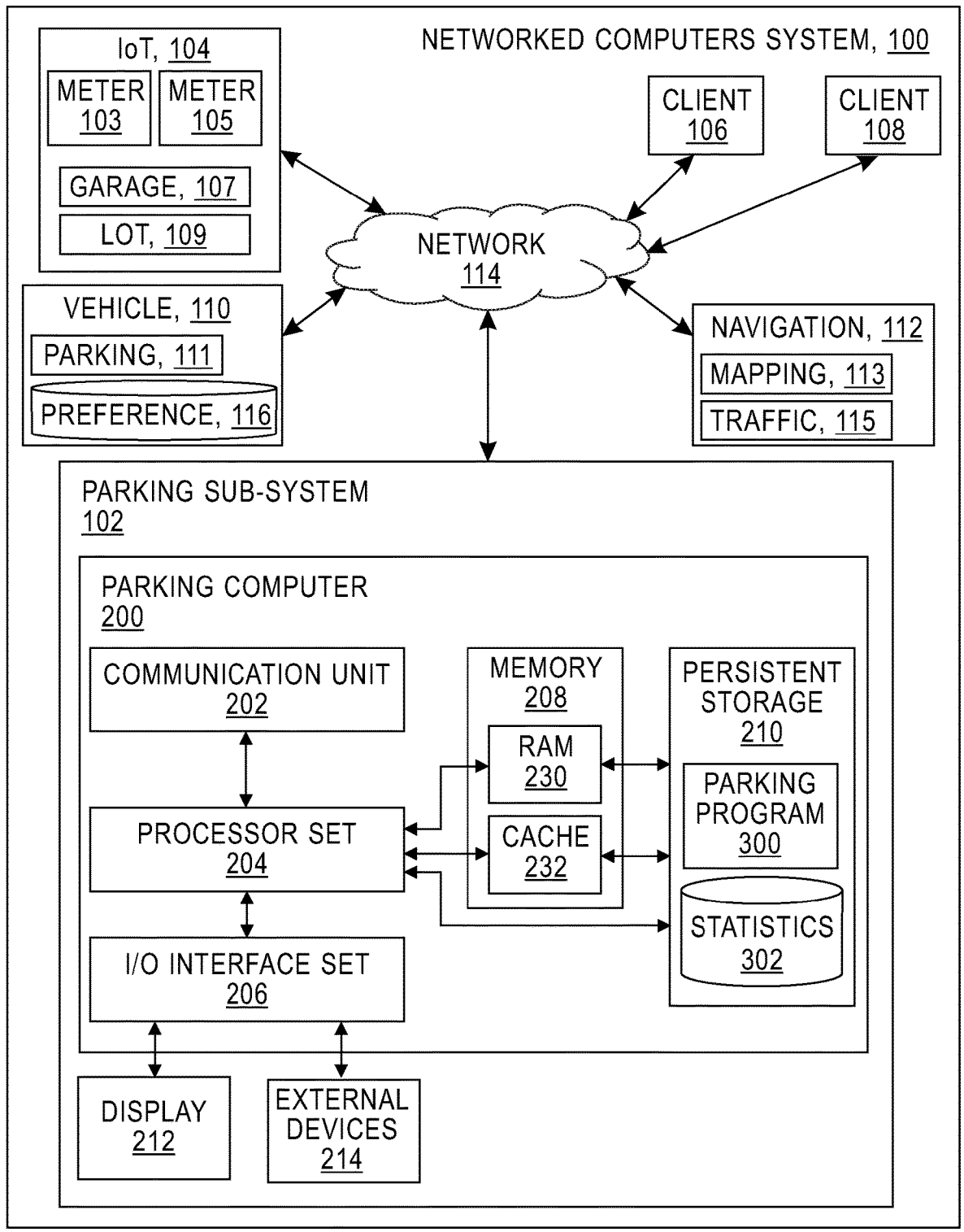
FIG. 1 is a block diagram view of a first embodiment of a system according to the present invention.

Some embodiments of the present invention are directed to generating parking area statistics for identifying parking areas within a geographic region. Navigation support for reaching a top-ranked parking area according to collected parking area data, user preferences, parking feedback, and real-time traffic conditions. Selection of a top-ranked parking area and monitoring progress during a parking event improve future identification and ranking of parking areas.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semi-conductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: parking subsystem 102 (sometimes herein referred to, more simply, as subsystem 102); internet of things (IoT) sub-system 104; parking meters 103 and 105; garage IoT devices 107; parking lot IoT devices 109; client subsystems 106, and 108; vehicle sub-system 110; parking application 111; user preference store 116; navigation sub-system 112; mapping application 113; traffic patterns module 115; and communication network 114. Parking subsystem 102 includes: parking computer 200; communication unit 202; processor set 204; input/output (I/O) interface set 206; memory 208; persistent storage 210; display 212; external device(s) 214; random access memory (RAM) 230; cache 232; parking program 300 (sometimes herein referred to, more simply, as program 300); and parking statistics and data collection store 302.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications, and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with assignment/optimization computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Along with developments in IoT infrastructures an increasing number of devices have been adopted to assess the occupancy of on-street and off-street parking and charging areas. In this disclosure, the term parking spot represents both parking-only and parking/charging areas. Some embodiments of the present invention address only charging stations. Some embodiments of the present invention distinguish between and identify both parking-only areas and parking/charging areas. While a number of methods have been proposed to estimate the parking availability from historical information and route the drivers accordingly, there is a lack of mechanisms for real-time parking allocation that manages the inherently uncertain and/or time-dependent components of the parking problem.

In this disclosure the terms parking spot, parking space, and parking area may be used synonymously. Where more than one term is discussed, the term parking area is a generic term representing parking spaces, parking spots, parking garages, and parking lots. Further, a parking space and parking spot refer to a location for a single vehicle to part and may be found within a parking garage, parking lot, or parking area.

In the absence of a reservation mechanism, parking/charging suggestions do not provide full certainty of a parking space but only an associated probability of success. This can be caused by a wide variety of factors including: (i) occupancy of parking spots from vehicles not registered in the system; (ii) noisy/missing measurements in sensor data; (iii) lack of real-time parking information. For example, a recommender system may suggest a parking spot along with route information. However, by the time the driver reaches the site, the state of the suggested parking spot may have changed (the spot may have become occupied) because of some unexpected event in the area during the trip to the parking spot. In such a case, the driver must find another available parking spot.

Route recommendations to reach a parking spot of interest are also subject to time-dependency due to unexpected traffic events and unaccounted traffic patterns. Appropriate assignment procedures provide parking recommendations considering the non-deterministic and dynamic nature of the parking problem in a cost-effective way. Cost may include route duration, probability of finding the parking/charging spot available, and fees for parking/charging. Drivers may specify preferences for parking (for example, maximum walking distance to a POI (point of interest), free/paid parking facilities, and/or charging technology (for example, power plug type, wattage)).

Figure 2:
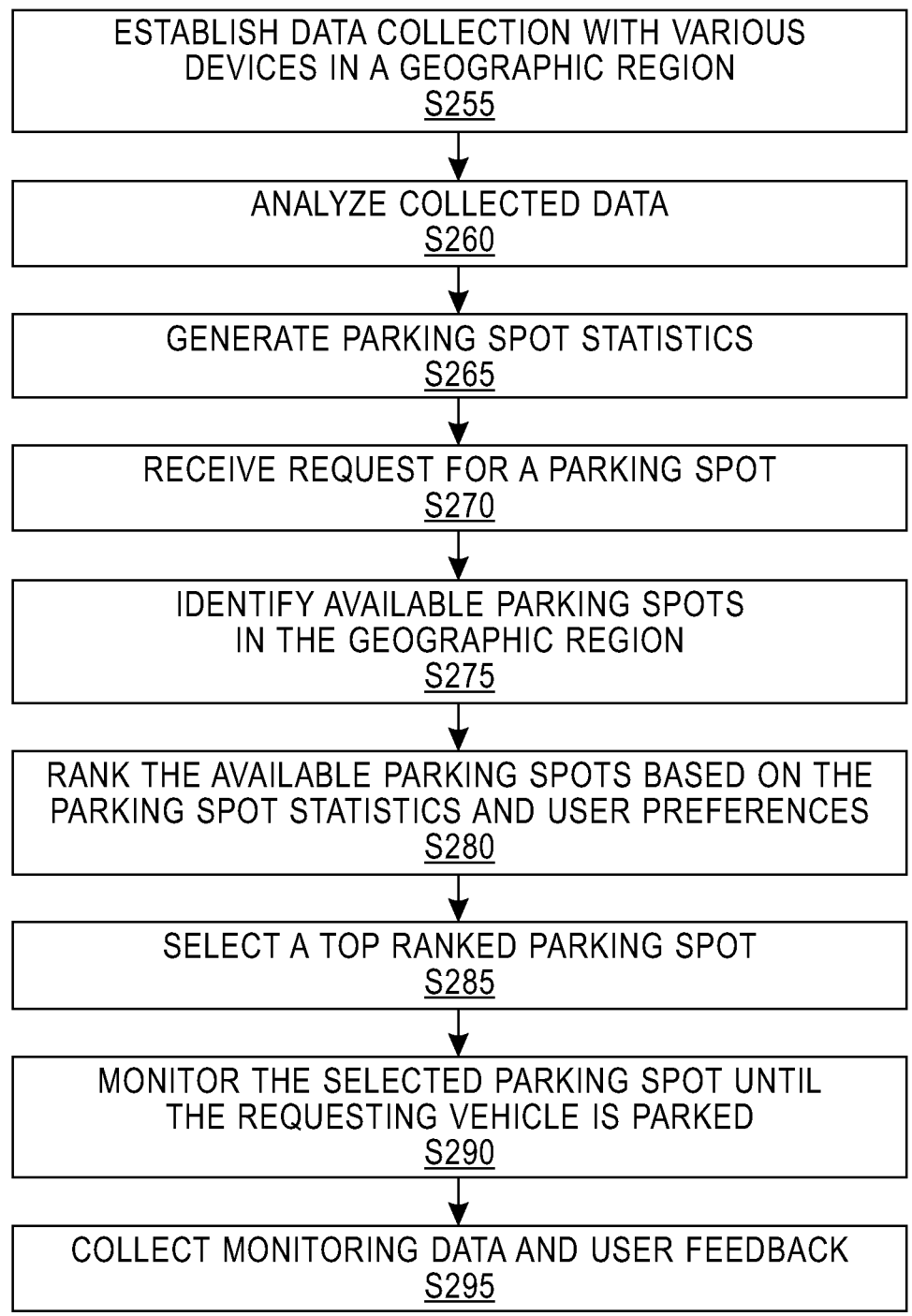
FIG. 2 is a flowchart showing a first embodiment method performed, at least in part, by the first embodiment system.
Figure 3:
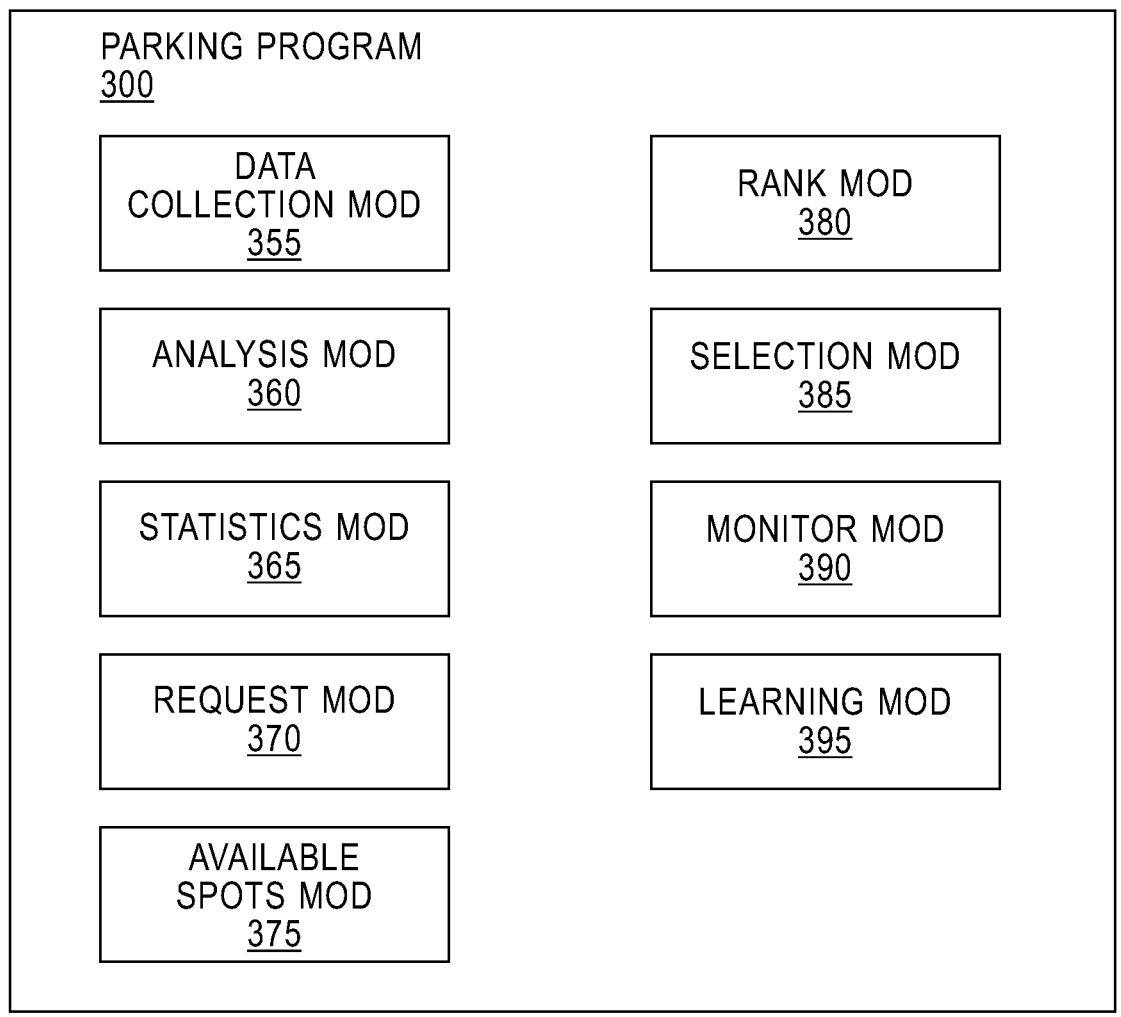
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where data collection module ("mod") 355 establishes data collection with various devices in a geographic region. The data collection mod collects data from IoT devices such as parking meters, parking garage devices, parking lot devices, closed-circuit (CCTV) television cameras, and other on-street and off-street connected devices. Further data collection may include traffic flow data collected from GPS or other navigation systems. Collected data represents a geographic region in which parking and/or charging of vehicles is often challenging and/or congested. In this example, data collected from IoT device sub-system 104 and from navigation sub-system 112 is stored in statistics store 302 (FIG. 1).

Processing proceeds to operation S260, where analyze mod 360 analyzes the collected data. The unstructured data collected in step S255 is processed by the analyze mod to identify patterns for use in predicting consumption of parking resources. The patterns identified in the collected data support the parking program in its function of identifying and ranking appropriate parking spots upon request by a user. Analyze mod 360 further identifies usage statistics for various parking spots throughout the geographic region.

Processing proceeds to operation S265, where statistics mod 365 generates parking area statistics. A set of parking area statistics are generated according to identified patterns and parking area usage in step S260. The set of parking area statistics is organized for each parking area in the geographic region including: (i) parking spots; (ii) parking garages; and (iii) parking lots. In this example, navigation sub-system 112 generates a parking-specific map for which the set of parking area statistics are applied as metadata. The resulting parking map is stored in statistics store 302 for on-demand access. According to some embodiments of the present invention, statistics mod 365 discovers statistical parking area properties based on historical parking area data, real-time usage data, and IoT device data. Further, the statistics mod may be enabled to store information to a prediction model that predicts parking area usage. Parking area statistics may include: (i) average duration of parking at each parking area; (ii) cost of parking at each parking area; and/or (iii) distance of each parking area from destinations within the geographic region.

Processing proceeds to operation S270, where request mod 370 receives a request for a parking area within the geographic region. Requests for a parking area may be received in various ways and may be prompted by various conditions. For example, a user enters a destination into a navigation system that identifies a route to be traversed by a vehicle. Upon reaching a pre-determined point along the route, a request is sent to the parking system for identification of a parking area. Another example is the use of an autonomous vehicle approaching the geographic area in preparation to park and predicting availability of parking areas in conjunction with real-time parking and traffic data received from a navigation system such as navigation sub-system 112 (FIG. 1). Another example of a request being received is when a user approaches a geographic region with intention to park and deploys a parking application such as parking application 110 to request parking support. According to some embodiments of the present invention the received request may include: (i) receiving a parking request for a preferred parking spot; (ii) a request for an on-street parking area; and/or (iii) a request for an off-street parking area. According to some embodiments of the present invention the received request may include: (i) receiving a parking request for a preferred parking spot; (ii) a request for an on-street parking area; (iii) a request for an off-street parking area; (iv) a request for a charging spot; and (v) a request for a parking spot in proximity of a point of interest.

Processing proceeds to operation S275, where available spots mod 375 identifies available parking areas in the geographic region. In this example, the available spots mod identifies available parking areas using navigation sub-system 112 for real-time availability along with the parking map stored in statistics store 302. The available spots mod uses statistical properties of parking availability from historical data and real-time observations to identify the parking area for a requesting vehicle or user. According to some embodiments of the present invention available spots mod 375 identifies candidate parking areas and determines associated travel routes based on user preferences in view of identified statistical parking area properties. Further, in some embodiments of the present invention, input such as time of day and current traffic patterns are utilized by the available spots mod to identify available parking areas.

Processing proceeds to operation S280, where rank mod 380 ranks the available parking areas based on the parking area statistics and user preferences. Certain statistics are used to rank the available parking areas such as average time an area is occupied and/or historical duration of availability at the time and day of the request. Other considerations when ranking parking areas include reference to current traffic patterns and current weather conditions. User preferences play a role in ranking available parking areas, such as covered parking, proximity to a destination within the geographic region, planned duration of parking, and/or cost of parking. Some embodiments of the present invention refer to a target destination and estimated route to the destination to select parking areas location en route to the destination. In that way, parking areas near the estimated route are ranked higher than parking areas further away.

Processing proceeds to operation S285, where selection mod 385 selects a top-ranked parking area. In this example, the selection mod selects a parking area ranked highest by rank mod 380 and instructs an autonomous vehicle to occupy the selected parking area. Alternatively, the select mod presents a selectable display of ranked available parking areas for selection by a user of a top-ranked parking area. Alternatively, top-ranked parking areas are communicated to a navigation system used by the vehicle for selection by the user of a route and parking area.

Processing proceeds to operation S290, where monitor mod 390 monitors the selected parking area until the requesting vehicle is parked. In this example, IoT device sub-system provides data for the selected parking area for analysis and review during the parking process. Should the selected parking area be occupied prior to arrival of the requesting vehicle further processing will occur. In this example, another selection process is performed by selection mod 390. Alternatively, processing returns to operation S275 where available parking areas are identified. Alternatively, a re-ranking process is performed by returning to step S280 where rank mod 380 ranks the remaining available parking areas.

Process concludes at step S295, where learning mod 395 collects monitoring data and user feedback. The learning mod facilitates a learning mechanism for improved identification and ranking of parking areas. User feedback is collected and stored for later consumption during analysis of collected data and generating the parking area statistics. Using this framework of feedback and monitoring data ensures an effective and reliable ranking of parking areas.

III. Further Comments and/or Embodiments

Some embodiments of the present invention are directed to learning a mechanism to model the uncertainty of parking/charging occupation that learns statistical properties of parking/charging availability from historical data and real-time observations made by IoT (internet of things), leverages the information gathered from dedicated on-street/off-street parking sensors and IoT devices, and receives parking/charging requests for spots close to the final destination or to preferred parking areas.

Figure 4:
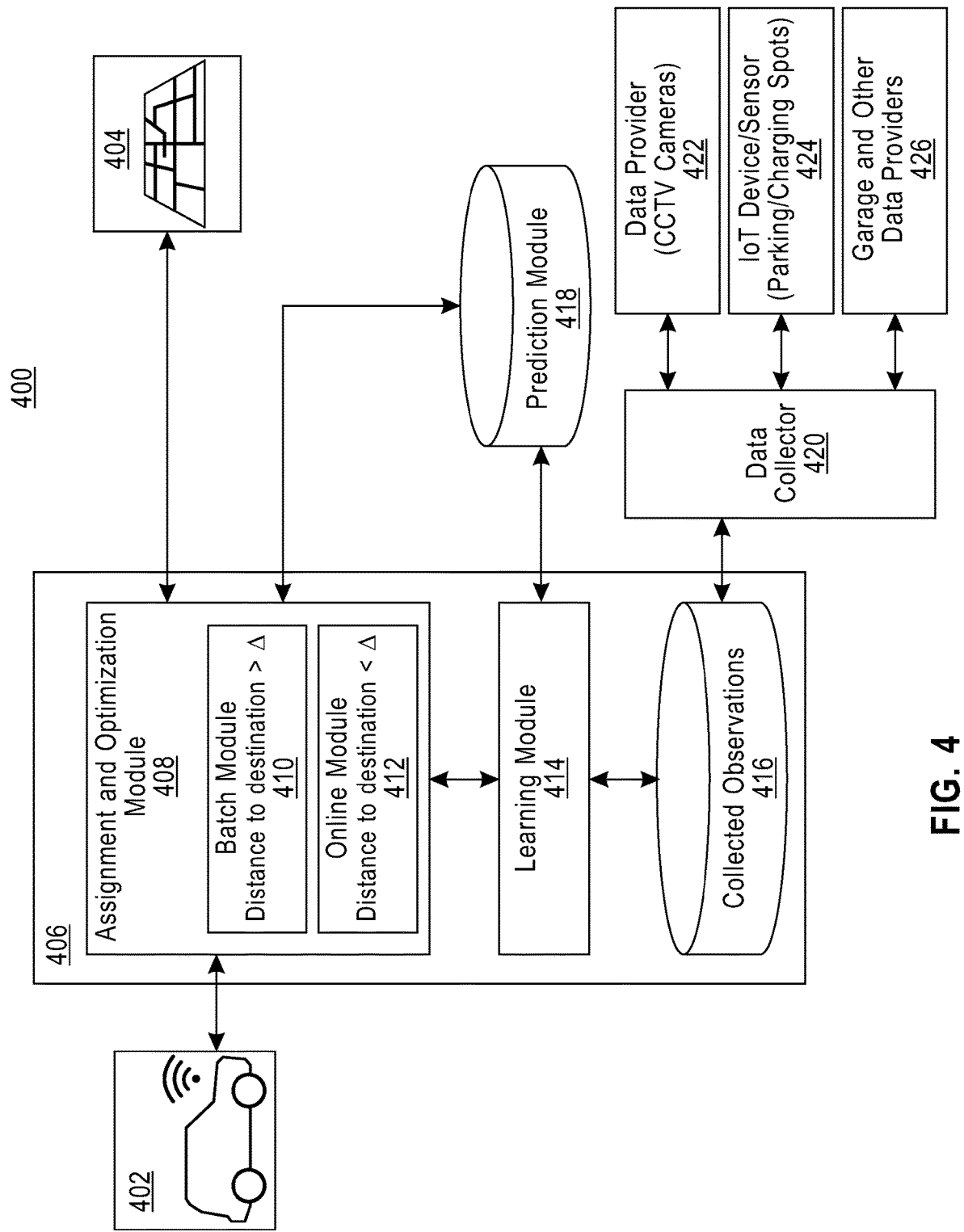
FIG. 4 is a block diagram view of a second embodiment system according to the present invention.

As shown in FIG. 4, guidance computing system 400 (sometimes herein referred to, more simply, as system 400) includes: vehicle sub-system block 402; maps sub-system block 404; utility manager sub-system block 406; assignment and optimization module block 408; batch module—distance to destination>Δ block 410; online module—distance to destination<Δ block 412; learning module block 414; collected observations storage block 416; prediction models storage block 418; data collector sub-system block 420; data provider (CCTV (closed circuit television) camera) sub-system block 422; IoT device/sensor (parking/charging spots) sub-system block 424; and garage sub-system block 426.

FIG. 4 depicts guidance computing system 400 according to a second embodiment of the present invention. Some embodiments of the present invention incorporate components of the guidance computing system into a networked computing environment such as networked computing environment 100 (FIG. 1).

Figure 5:
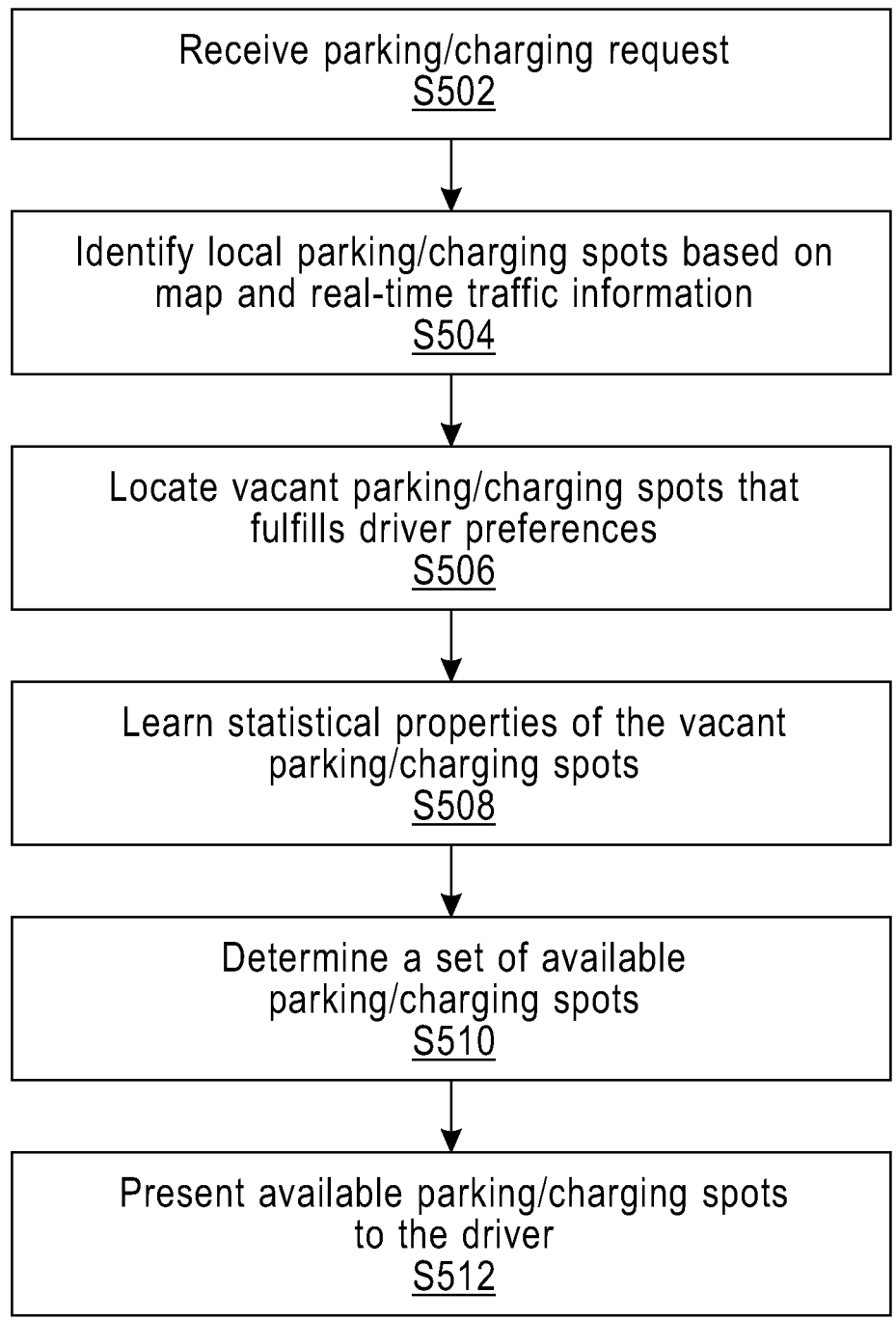
FIG. 5 is a flowchart showing a second embodiment method performed, at least in part, by the second embodiment system.

As shown in FIG. 5, operations described in flowchart 500 are performed at least in part on computer software running on computer hardware. An example environment in which these operations may be performed is networked computers system 100 (FIG. 1).

In addition, as shown in FIG. 5, flowchart 500 shows an example method according to a second embodiment of the present invention. This method and associated software will now be discussed, over the course of the following paragraphs, with reference to FIG. 4, guidance computing system 400.

Processing begins at operation S502, where system 400 receives a parking/charging request. In this example, the parking/charging request is performed between vehicle sub-system 402 and assignment and optimization module 408 within utility manager sub-system 406. This request also includes the preferences of the driver making the request. In addition, this request includes, but is not limited to, receiving parking/charging requests to preferred parking areas close to the drivers' final destination.

Processing proceeds to operation S504, where system 400 identifies local parking/charging spots based on map and real-time traffic information. In this example, maps sub-system 404 inputs data to assignment and optimization module 408 within utility manager sub-system 406. Also included as input to assignment and optimization module 408 is context data, which includes but is not limited to weather, events, time of the day, and day of the week that may have direct impact on the parking occupancy estimation for the driver.

Processing proceeds to operation S506, where system 400 locates vacant parking/charging spots that fulfill the driver preferences. In this example, assignment and optimization module 408 solves the parking spot allocation problem, thus maximizing the chances of finding a vacant parking spot that fulfils the driver's preferences. Communication data is shared back and forth between assignment and optimization module 408 and vehicle sub-system 402. Assignment and optimization module 408 returns information to the driver in the form of a suggested route to the top ranked parking spot at the time of the request as well as updates on the proposed route and assigned parking spots/sites while driving. In addition, assignment and optimization module 408 provides real-time optimal parking suggestions, which are statistically reliable, cost-effective, and accommodating to the drivers' preferences (for example, each parking suggestion consists of a parking spot and a route). Alternatively, assignment and optimization module 408 solves the allocation problem as a time-dependent problem under uncertainty, which maximizes the reliability of parking/charging suggestions and the satisfaction of driver preferences and minimizes a measure of inconvenience related to re-assignment in case the suggestion cannot be accommodated. Also, assignment and optimization module 408 provides the top ranked parking suggestions to each driver, and the top ranked solution of the optimization-based problem. Here, the optimization solution consists of a parking/charging suggestion for each driver where each parking/charging suggestion is made up of a parking/charging destination parking spot and a route.

Processing proceeds to operation S508, where system 400 learns statistical properties of the vacant parking/charging spots. In this example, learning module 414 within utility manager sub-system 406 learns statistical properties from historical data and real-time observations. In this example, learning module 414 uses and processes the following types of data: (i) historical sensor data pertaining to the availability of on-street and off-street parking/charging spots (for example, parking sensors); (ii) real-time parking/charging spot observations (for example, cameras and on-board sensors); (iii) current traffic patterns; (iv) parking/charging requests (for example, trip origin and destination); and (v) preferences submitted by the involved drivers. In addition, learning statistical properties of parking/charging availability from historical data and IoT devices (for example, parking sensors, cameras, on-board sensors) is also performed. In addition, learning module 414 collects and records parking/charging information within collected observations storage 416. Collected observations storage 416 shares both recent observations and historical observations with learning module 414 and assignment and observations module 408. In addition, collected observations storage 416 communicates with data collector sub-system 420. Data collector sub-system 420 obtains data from and communicates with: (i) data provider sub-system 422; (ii) IoT device/sensor sub-system 424; and (iii) garage sub-system 426. Further, prediction models storage 418 stores parking prediction data that was learned by learning module 414 and communicates this information back to assignment and optimization module 408 for further processing.

Processing proceeds to operation S510, where system 400 determines a set of available parking/charging spots. In this example, assignment and optimization module 408 within utility manager sub-system 406 determines the distance to the destination where the destination is further than a distance delta from the current spot using batch module 410. In this example, parking/charging requests to destinations and the current drivers' spots (for example, distant requests, further than a distance delta to the destination) are also processed within assignment and optimization module 408. Similarly, assignment and optimization module 408 within utility manager sub-system 406 also determines the distance to the destination where the destination is less than a distance delta from current spot using online module 412. In this example, parking/charging requests to destinations and the current user spots (for example, close requests (nearer than a distance delta to the destination)) are also processed within assignment and optimization module 408. In addition, system 400 uses prediction models storage 418 to help predict desired parking/charging spots for the driver.

Processing concludes at operation S512, where system 400 presents available parking/charging spots to the driver. In this example, system 400 can display parking/charging spots to the driver for on-street parking, off-street parking, and parking garage spots. Route suggestions are also provided. The information displayed to the driver can be in the form of a wireless communication such as an image on the vehicles in-dash navigation system, smartphone, smartwatch, tablet, or another electronic device such as a laptop computer. In one embodiment of the present invention, FIG. 6, screenshot 600 shows a typical example of the output displayed to the driver and will be further discussed below.

Some operations of the parking program may be performed in real-time. For purposes of the present description, real-time shall include any time frame of sufficiently short duration as to provide reasonable response time for information processing acceptable to a user of the subject matter described. Additionally, the term "real-time" shall include what is commonly termed "near real-time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 6:
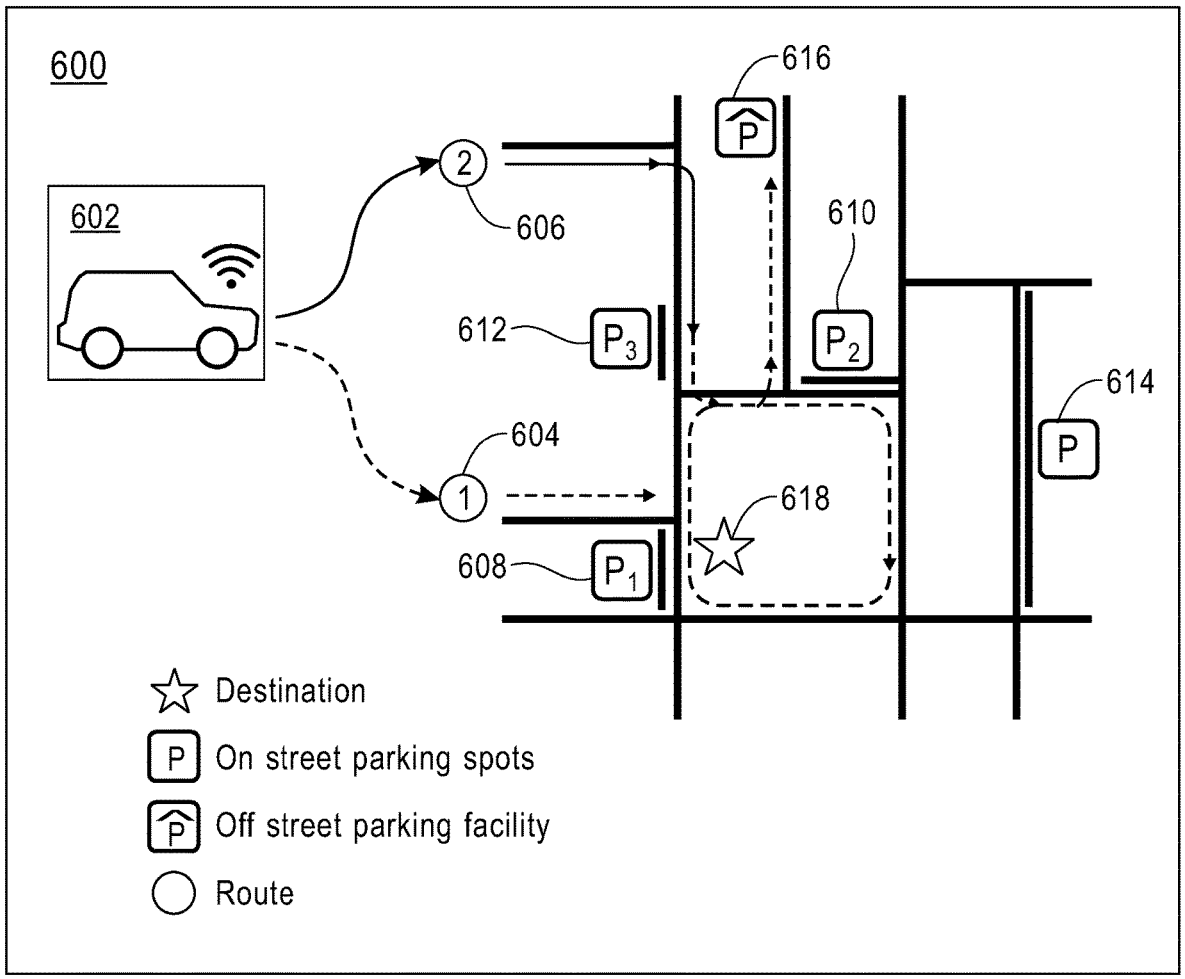
FIG. 6 is a screenshot view showing information that is generated by and/or helpful in understanding embodiments of the present invention.

As shown, FIG. 6 screenshot, 600 includes: driver block 602; route 1 block 604; route 2 block 606; on-street parking spot/site 1 block 608; on-street parking spot/site 2 block 610; on-street parking spot/site 3 block 612; alternate parking spot/site block 614; off-street parking facility block 616; and destination block 618.

Some embodiments of the present invention may include one, or more, of the following operations, features, characteristics and/or advantages with respect to parking suggestions discovered along the route as shown in FIG. 6, screenshot 600: (i) shows the initial request (602) made at time T yields route 1 (604) as the shortest/fastest path at the time when the request was made: (a) parking site 1 (608) is suggested as a preferred site with the highest probability of finding a parking spot, and (b) a batch module is used to provide the suggestion; and (ii) while the vehicle is following its path, traffic situations may change and route 1 (604) is not the top ranked route anymore, so the system updates the route and suggests route 2 (606) and parking site 3 (612), where: (a) when the vehicle reaches parking site 3 (612) there may be no vacancies, (b) if this is the case, then the system asks the online optimization module to suggest one of the two remaining parking sites (that is, parking site 1 (608) and 2 (610)), (c) the online optimization module routes the driver to parking site 2 (610), which has the highest chances to find a parking spot and accommodates the users preferences, and (d) depending on the users preferences, the user may end up parking at the closest off-street parking facility/garage (616) or be re-routed to a larger area (614). The driver's final destination is then reached (618).

Some embodiments of the present invention may include one, or more, of the following operations, features, characteristics and/or advantages: (i) provides real-time parking/charging suggestions that ensure an effective and reliable service under uncertainty; and (ii) proposes a system and method with two main components: (a) a learning mechanism to model the uncertainty of parking/charging occupation, while leveraging the information gathered from dedicated on-street/off-street parking sensors and IoT devices (including those from road users and fixed infrastructure), and (b) the learning mechanism is integrated into a dynamic optimization based framework for parking/charging allocation that allows for online suggestions and ensures an effective and reliable service in real-time.

Some embodiments of the present invention may include one, or more, of the following operations, features, characteristics and/or advantages: (i) discloses a system and the associated method for real-time parking/charging suggestions; (ii) processes the requests in real-time so as to optimize the assignment of drivers to parking/charging spots while dealing with the uncertainty and time-dependency in parking/charging availability; and (iii) ensures an effective and reliable assignment service, specifically: (a) optimality: (1) consists in minimizing the overall cost and driving time (including deviations from a preferred parking area), (2) meeting the drivers' preferences/requirements, and (3) maximizing the occupancy of parking/charging spots, (b) parking/charging availability is affected by: (1) uncertainty due to vehicles not being registered to the system, or (2) due to noisy/missing measurements in parking sensor data, (c) parking/charging assignment depends on the estimated travel time to reach the drivers' destination and also on the time at which the request is triggered including route recommendations that are also time-dependent, mainly due to traffic patterns, (d) effectiveness of the parking/charging assignment is measured via performance indicators such as: (1) the number of required assignment attempts until success, and (2) walking distance from found parking/charging spot to the final destination, and (e) the level of reliability of parking/charging suggestions is assessed via: (1) a statistical and time-dependent characterization of the occupancy and, (2) a measure of the inconveniences due to the assignment (for example, initial parking/charging destination unexpectedly occupied).

Some embodiments of the present invention may include one, or more, of the following operations, features, characteristics and/or advantages: (i) learns statistical properties of parking/charging availability from historical data and real-time observations made by IoT devices (for example, parking sensors, cameras, and on-board vehicle sensors); (ii) receives parking/charging requests for spots close to the final destination or to preferred parking areas; (iii) parking/charging requests and current user spots are sent to: (a) a batch-based assignment optimization module if final destination is further than a distance delta from the current spot, and (b) otherwise, an online optimization-based module; (iv) while the batch-based optimization module is meant to route the driver from the starting point to the proximity of the desired destination, the uncertainty and time-dependency of traffic conditions and parking/charging status call for the need of an online module which updates the route when the driver is about to reach the suggested parking spot; (v) the optimization-based modules solve the allocation problem as a time-dependent problem under uncertainty which: (a) maximizes the reliability of parking/charging suggestions and the satisfaction of driver preferences, and (b) minimizes a measure of inconvenience related to re-assignment in case the suggestion cannot be accommodated; (vi) the optimization solution consists of a parking/charging suggestions for each driver; and (vii) each parking/charging suggestion is made up of a parking/charging destination parking spot and a route.

Some embodiments of the present invention may include one, or more, of the following operations, features, characteristics and/or advantages with respect to learning statistical properties of parking/charging availability: (i) purpose: learn statistical information of the parking/charging availability for the parking spots of interest at a given time; (ii) inputs: (a) historical parking occupancy including vehicles not registered to the service, (b) historical context data associated with the parking/charging requests (for example, weather, events, time of the day, and day of the week), and (c) real-time parking status/availability if detected by devices (that is, parking/charging sensors, cameras, and on-board vehicle sensors); (iii) outputs: statistical properties of the parking/charging availability distribution (for example, probability distribution moments, worst-case bounds, and parameters of the statistical models, etc.); and (iv) method: this may be achieved using: (a) time series methods, (b) deep learning methods (for example, recurrent neural network, LSTM (long short-term memory) networks, (c) multi-layer perceptron networks), (d) reinforcement learning methods (uniform PAC (probably approximately correct)), (e) Bayesian methods (maximum likelihood estimation (MLE)), (f) expectation maximization (EM)), and (g) empirical methods (kernel density estimation (KDE)), etc.

Some embodiments of the present invention may include one, or more, of the following operations, features, characteristics and/or advantages with respect to a first optimization-based module: (i) purpose: in a given time instant, express the problem of assigning parking/charging requests from drivers to parking spots in an optimization-based module; and (ii) inputs learning: (a) statistical characterization of parking/charging availability, (b) current context (for example, time of the day, day of the week, weather, and today's events), (c) traffic patterns, (d) parking/charging requests consisting of trip origin and destination, (e) user preferences such as: (1) maximum travel time, (2) detour time from a preferred parking destination, and/or (3) power plug type, and (f) a measure of inconvenience related to re-assignment in case the initial suggestion cannot be accommodated.

Some embodiments of the present invention may include one, or more, of the following operations, features, characteristics and/or advantages with respect to a second optimization-based module: (i) outputs: (a) optimization-based module for the problem of assigning parking/charging requests from drivers to available parking spots, (b) the objective is to: (1) minimize the drivers' inconveniences in relation to searching for a parking/charging spot, (2) take into account their preferences and requirements, and (3) ensure a cost-effective and statistically reliable allocation, and (c) the module consists of a batch-based assignment component, pertaining to: (1) requests with a destination further than a certain distance delta from the spot at the time of request, and (2) an online component for drivers closer to their destinations; (ii) method: (a) drivers submit requests in a preferred area (from batch) to the broker, (b) the broker sets up an optimization-based module for the allocation problem by: (1) considering the statistical characterization of the parking/charging availability, (2) determining the time-dependent routing cost to an available, in an uncertain sense, parking/charging spot as close as possible to a preferred POI (for example, the final destination), (3) modeling driver preferences as soft-constraints, and (4) expressing the parking/charging allocation problem as a time-dependent and uncertain optimization problem, (c) for the batch-assignment module, this may be achieved using a non-deterministic mathematical programming formulation such as: (1) stochastic programming, (2) robust programming, and (3) chance-constrained programming with time-dependency in the travel times, and (d) for the online assignment module, online learning and assignment methods involve techniques such as: (1) reinforcement learning, and (2) multi-arm bandits.

Some embodiments of the present invention may include one, or more, of the following operations, features, characteristics and/or advantages with respect to suggesting parking/charging spot allocations: (i) purpose: based on the current parking/charging requests and assignment model, provides optimal suggestions to the drivers; (ii) inputs: formulation for an optimization-based problem; (iii) outputs: the top ranked solution of the optimization-based problem is the parking/charging suggestion for each driver consisting of: (a) intended parking spots, and (b) the route to be followed; and (iv) method: (a) for the offline assignment method, the solution algorithm is dependent on the mathematical paradigm chosen to express the uncertainty and time-dependencies (examples include stochastic programming, chance-constraint programming and progressive hedging), and (b) for the online assignment method, the solution algorithm is in charge of coping with the non-stationarity and uncertainty of the environment (examples include providing top ranked policies obtained from online model-based reinforcement learning).

Some embodiments of the present invention may include one, or more, of the following operations, features, characteristics and/or advantages with respect to updating the parking/charging suggestions: (i) update the parking/charging suggestions when: (a) a new request is received by the system, and/or (b) an unexpected event occurs (for example, suggested parking spot is occupied, and road disruption); (ii) inputs: (a) new parking/charging request, and/or (b) an unexpected event affecting an existing assignment; (iii) outputs: (a) updated statistical characterization of parking/charging availability, (b) the updated optimization-based formulations, and (c) updated parking/charging suggestions to the drivers; and (iv) method: re-running the process operations once a new parking request or an event affecting an existing assignment occurs.

Some embodiments of the present invention may include one, or more, of the following operations, features, characteristics and/or advantages with respect to an offline parking suggestion: (i) scenario: a driver starts his/her trip and requests a parking suggestion close to the destination; (ii) the system gathers the parking requests further than a certain distance delta to the destination and applies the following properties/input data: (a) learns statistical characterization of parking availability in the area around the destination (size of the area depends on user preferences such as accepted walking time from a parking place to the final destination), (b) current context (for example, time of the day, day of the week, weather, and today's events), (c) traffic patterns, (d) current parking requests to the same destination area, (e) user preferences (maximum travel time, or detour time from a preferred parking destination), and (f) optionally, determines a measure of inconvenience related to re-allocation in case the parking suggestion cannot be accommodated; (iii) the system models and solves the problem of assigning drivers to parking spots (for example, via stochastic programming, robust programming or chance-constrained programming) and: (a) provides a suggested parking spot, (b) provides the top ranked route to that spot minimizing the drivers' inconveniences, and (c) addresses the drivers' preferences; (iv) the system checks driver spots and real-time changes of traffic pattern, parking availability, etc.; and (v) when the driver comes closer to the destination and reaches distance delta to the destination, or events affecting traffic or parking availability are detected, the system switches to the online optimization module and provides updates and suggestions to the route and parking spots in an online fashion.

Some embodiments of the present invention may include one, or more, of the following operations, features, characteristics and/or advantages with respect to an online parking suggestion: (i) scenario: a driver is in the proximity of the final destination and the system switches to the online optimization module for the driver; (ii) an optimization process (for example, RL-based (reinforcement learning)) in the online module continuously runs in the background where: (a) the process is running for a single area of interest and this area covers the destination of the driver (for example, a city is divided into a set of areas of interest, each of them governed by an independent online optimization process), (b) the process takes into account: (1) both historical and real-time parking availability, and (2) other drivers' parking preferences, traffic information, etc., and (c) the process continuously updates the policy that solves the assignment problem for that particular area; (iii) the online optimization process is enquired and the optimum policy is applied given the driver's: (a) current spot, (b) intended target spot, and (c) preferences (for example, route suggestions are personalized in the sense that take into account not only the current spot of the driver, but also the user's preferences such as a trade-off between the expected travel time and probabilities of finding on-street parking on the way to the destination); (iv) the output includes: (a) the route recommendations are such that the chances of finding on-street parking on the way to the targeted destination are maximized, and (b) the suggested parking facility that suits the drivers' request at that time; (v) the system updates the route and provides the top ranked parking spot while the driver explores the route (for example, as there is no underlying reservation service for the assignment, the driver is in charge of discovering the parking spot while following the parking-optimized recommended route); and (vi) the data gathered during this trip (for example, parking availability, and traffic conditions) will be used as an additional input to update the online optimization model.

Some embodiments of the present invention may include one, or more, of the following operations, features, characteristics and/or advantages with respect to a real-time parking/charging suggestion: (i) taking as input: (a) context data (weather, events, time of the day, and day of the week) that may have direct impact on the parking occupancy estimation, (b) historical sensor data pertaining to the availability of on-street and off-street parking/charging spots, (c) real-time parking/charging spot observations (cameras, and on-board sensors), (d) traffic patterns, and (e) parking/charging requests (trip origin and destination) and preferences submitted by drivers; (ii) returning as output: real-time optimal parking suggestions, which are: (a) statistically reliable, (b) cost-effective, and (c) accommodates drivers preferences (for example, each parking suggestion consists of a parking spot and a route; and (iii) performs the following operations: (a) learns statistical properties of parking/charging availability from: (1) historical data, and (2) IoT devices (for example, parking sensors, cameras, and on-board sensors), (b) receives parking/charging requests to preferred parking areas or close to final destination, (c) parking/charging requests to destinations and current user spots (for example, distant requests (further than a distance delta to the destination) are sent to a batch-based assignment optimization module, while closer requests are sent to an online optimization-based module), (d) the optimization-based modules: (1) solves the parking allocation problem as a time-dependent problem under uncertainty, (2) maximizes the reliability of parking suggestions and the satisfaction of driver preferences, and (3) minimizes a measure of inconvenience related to re-routing to the next parking spot in case the parking suggestion cannot be accommodated; and (e) provides the top ranked parking suggestions to each driver as the optimum solution for the optimization-based problem.

Some embodiments of the present invention may include one, or more, of the following operations, features, characteristics and/or advantages: (i) difference in the combination of inputs and outputs; (ii) includes a learning mechanism to model the uncertainty of parking/charging occupation while leveraging the information gathered from on-street and off-street parking/charging sensors; and (iii) includes real-time optimization-based framework for parking/charging allocation which ensures an effective and reliable service in real-time.

Some embodiments of the present invention may include one, or more, of the following operations, features, characteristics and/or advantages: (i) analytics are used for parking availability; (ii) addresses uncertainty and time-dependency; (iii) parking availability is predicted from historical data; (iv) assignment is performed for multiple drivers; (v) uses an allocation algorithm; (vi) includes time-dependency in the drivers' route; (vii) assignment is mostly based on the number of people in the vehicle; (viii) includes analytics for parking occupancy; (ix) includes an assignment algorithm or analytics for parking prediction; (x) considers charging stations in parking spots; and (xi) assignment is optimized for electric vehicle parameters.

Some embodiments of the present invention may include one, or more, of the following operations, features, characteristics and/or advantages: (i) optimization criteria is integrated in the parking spot allocation; (ii) is tailored for the case of multiple vehicles having a common destination; (iii) assignment is based on the proximity of the parking spots; (iv) parking allocation is based on a bidding mechanism; (v) includes an advising system for a multimodal journey; (vi) includes operational actions such as assignment of parking spots to users; (vii) includes parking availability and detection; (viii) the perspective of municipality is addressed; (ix) guidance accounts for optimality with respect to a target final destination; (x) does not require fine-grained traffic information; (xi) immediate guidance is obtained after the request; (xii) considers on-street parking; (xiii) uses driving duration whether or not a parking reservation is used; (xiv) considers driving duration; and (xv) considers the effects of traffic.

Some embodiments of the present invention may include one, or more, of the following operations, features, characteristics and/or advantages: (i) integrates prediction of on-street and off-street parking/charging availability with an optimization-based parking allocation of drivers to parking spots; (ii) guarantees optimal driver assignment to: (a) predict parking/charging spots according to measures of confidence/risk, (b) copes with the inherent uncertain and time-dependent aspects of parking occupancy, and (c) aims to accommodate drivers preferences; (iii) is relevant to activity in the automotive industry; and (iv) leverages partnerships with automotive companies trying to penetrate IoT and mobility markets.

Some embodiments of the present invention may include one, or more, of the following operations, features, characteristics and/or advantages: (i) suggests on-street and off-street parking spots to drivers, while taking the uncertainty and time-dependency of parking availability into account; (ii) consists of a broker that is connected to parking sensors or services where the broker receives vehicle/driver real-time parking requests, in a selected area, and monitors the occupancy of parking spots/sites; (iii) processes the driver requests, in real-time, so as to optimize the assignment of drivers to parking spots; (iv) deals with the uncertainty and time-dependency in parking availability; and (v) ensures an effective and reliable assignment service, specifically: (a) optimality consists in minimizing: (1) the overall cost and time for driving (driving times, and deviation from a preferred parking area), (2) maximizing the driver preferences/requirements, and (3) maximizing the occupancy of the parking spots, (b) parking availability is affected by: (1) uncertainty due to vehicles not being registered to the system, and (2) noisy/missing measurements in parking sensor data, (c) parking availability is dependent on the estimation of the travel time needed to reach the driver destination where the route of the driver is subject to time-dependency due to events and traffic patterns, (d) effectiveness of the parking assignment is measured via performance indicators, such as the driver detours from preferred parking areas, and (e) given that parking suggestions are inherently uncertain, the assignment service provides a reliable plan of parking suggestions where: (1) the level of reliability of each parking suggestion is assessed via a statistical and time-dependent characterization of the parking occupancy, and (2) there is a measure of inconveniences due to re-routing to another parking destination (for example, initial parking destination is unexpectedly occupied).

Some embodiments of the present invention may include one, or more, of the following operations, features, characteristics and/or advantages: (i) describes a system and the associated method for suggesting on-street and off-street parking spots/sites to drivers; and (ii) takes into account the uncertain and time-dependent aspects of parking availability.

Some embodiments of the present invention may include one, or more, of the following operations, features, characteristics and/or advantages: (i) parking service: parking services consider both on-street and off-street parking where it is assumed that sensors (for example, cameras, and devices installed in each parking spot) are adopted, even partially, for such services to provide data on the availability of parking spots; (ii) smart parking broker: the smart parking broker, also referred to as "broker", is a system that is connected to a number of vehicles subscribed to the service and senses parking spots, queried by the drivers, for an optimal parking suggestion in a preferred area; (iii) parking suggestion: the result of the assignment is a suggested allocation of vehicles to available parking spots/sites where the occupancy of a parking spot cannot be assessed with certainty for a number of reasons such as: (a) vehicles that are not registered to the parking service are not tracked, (b) the information coming from parking sensors may be partial, and (c) real-time events (road work can occupy on-street parking spots) may affect predictions, etc.; (iv) effectiveness: an effective allocation of vehicles to parking spots is profitable if: (a) it satisfies the overall user preferences and requirements, and (b) limits inconveniences in the parking experience (such as detour times, etc.); (v) reliability: the parking suggestions are reliable because they: (a) ensure the availability of the parking spot in the sense of the statistical criterion of parking availability adopted by the mathematical programming (MP) formulation (for example, minimizing the expected value of occupancy in stochastic programming and allocating according to the worst-case bound in robust programming), and (b) minimize the re-routing inconveniences, inconvenience measure, due to occupied parking destinations (for example, detour time to reach the closest parking spot or a cluster of parking spots); and (vi) takes inconvenience into account including: (a) pre-processing (for example, single value and/or average) and/or (b) post-processing (matrix).

Some embodiments of the present invention may include one, or more, of the following operations, features, characteristics and/or advantages with respect to: (i) a learning method (for example, deep neural network, LSTM, maximum likelihood estimation (MLE), expectation maximization (EM), and kernel density estimation (KDE)) estimates statistical properties (for example, probability distribution moments, worst case bounds, and parameters of the statistical models) of the parking occupancy of each parking spot; (ii) an inconvenience measure is associated with each parking spot based on the spatial disposition of the parking spots; (iii) a mathematical programming (MP) formulation (stochastic programming, robust programming, and chance-constrained programming) models the uncertain assignment by integrating availability and inconvenience information; (iv) the assignment problem is solved by an optimization-based algorithm and a list of the top ranked optimal parking suggestions are provided to the user; and (v) as the availability of parking spots is checked in real-time, statistical information and MP formulation are updated, and a time-dependent optimization algorithm is applied.

Some embodiments of the present invention may include one, or more, of the following operations, features, characteristics and/or advantages: (i) provides optimization-based parking suggestions both at an offline (batch-based) level and an online level so as to provide reliable routing plans to drivers; (ii) ensures to provide parking suggestions that are optimal for a number of metrics and globally for the drivers; (iii) includes a batch-based parking suggestion module to ensure reliable and convenient routes for drivers where the destination is far; (iv) learns statistical properties of parking/charging availability from historical data; (v) leverages the statistical information of parking availability and real-time monitoring of parking spots into optimization-based modules aimed to ensure a cost-effective and reliable parking recommendation service; and (vi) includes optimization-based modules to provide an assignment of drivers to parking spots in a cost-effective and reliable way.

Some embodiments of the present invention may include one, or more, of the following operations, features, characteristics and/or advantages: (i) provides optimization-based parking suggestions to drivers, consisting of routes and parking spots, in a cost-effective and reliable manner; (ii) leverages the parking availability information to provide parking suggestion to drivers; (iii) parking suggestions are based on cost-efficiency and reliability metrics for all drivers involved; (iv) does not rely on a reservation system to secure parking assignments; (v) does not require the user to: (a) specify a constraint (upper bound) on an acceptable parking cost, and (b) specify a constraint (upper bound) on a desired walking distance between the parking spot and the user's final destination (for example, information can be parsed, however it is not a strict requirement); (vi) leveraging statistical information obtained from historical data; (vii) copes with both batch-based and online assignment; (viii) collects historical observations from the parking spots/facilities and learns their statistical properties of parking spots/facilities; (ix) provides optimization-based parking suggestions even when the destination is considered far from the current driver spot; and (x) relaxes the requirement to secure assignment via a reservation system.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   receiving, by a server, through a communication network and from a device of a user travelling in a vehicle, a batch mode request for an available parking area to park a vehicle proximate to a travel destination, with batch mode being a mode of data communication where online communication is intermittent;
   while the server in batch mode communication with the device of the user:
      identifying a set of available parking areas within the geographic area based on parking area data collected from a set of internet of things (IoT) devices operating various parking areas and parking area statistics;
      selecting a top-ranked parking area from the set of available parking areas based at least in part upon user preferences,
      presenting the top-ranked parking area in response to the requested available parking area, and
      determining that the vehicle has come within a predetermined threshold distance of the top-ranked parking area;
   responsive to the determination that the vehicle is within a predetermined threshold distance of the top-ranked parking area, switching a mode of communications between the server and the device of the user to online mode, with online mode being a mode of data communication where online communication is continuous; and
   communicating in online mode, from the server, over the communication network and to the device of the user, route information helpful in travelling from a current position of the vehicle to the top-ranked parking area.

2. The computer-implemented method of claim 1, further comprising:
   communicating in online mode, from the server, over the communication network and to the device of the user, availability of the top-ranked parking area
   after the vehicle is within the predetermined threshold distance of the top-ranked parking area.

3. The computer-implemented method of claim 1 wherein the user preference is walking distance between a given parking area and the travel destination.

4. A computer program product comprising:
   a set of storage device(s); and
   computer code stored collectively in the set of storage device(s), with the computer code including data and instructions to cause a processor(s) set to perform at least the following operations:
   receiving, by a server, through a communication network and from a device of a user travelling in a vehicle, a batch mode request for an available parking area to park a vehicle proximate to a travel destination, with batch mode being a mode of data communication where online communication is intermittent,
   while the server in batch mode communication with the device of the user:
      identifying a set of available parking areas within the geographic area based on parking area data collected from a set of internet of things (IoT) devices operating various parking areas and parking area statistics,
      selecting a top-ranked parking area from the set of available parking areas based at least in part upon user preferences,
      presenting the top-ranked parking area in response to the requested available parking area, and
      determining that the vehicle has come within a predetermined threshold distance of the top-ranked parking area;
   responsive to the determination that the vehicle is within a predetermined threshold distance of the top-ranked parking area, switching a mode of communications between the server and the device of the user to online mode, with online mode being a mode of data communication where online communication is continuous, and
   communicating in online mode, from the server, over the communication network and to the device of the user, route information helpful in travelling from a current position of the vehicle to the top-ranked parking area.

5. The computer program product of claim 4, wherein the computer code further includes instructions for causing the processor(s) set to perform the following operation(s):

communicating in online mode, from the server, over the communication network and to the device of the user, availability of the top-ranked parking area after the vehicle is within the predetermined threshold distance of the top-ranked parking area.

6. The computer program product of claim 4 wherein the user preference is walking distance between a given parking area and the travel destination.

7. A computer system (CS) comprising:
   a processor(s) set;
   a set of storage device(s); and
   computer code stored collectively in the set of storage device(s), with the computer code including data and instructions to cause the processor(s) set to perform at least the following operations:
      receiving, by a server, through a communication network and from a device of a user travelling in a vehicle, a batch mode request for an available parking area to park a vehicle proximate to a travel destination, with batch mode being a mode of data communication where online communication is intermittent,
      while the server in batch mode communication with the device of the user:
         identifying a set of available parking areas within the geographic area based on parking area data collected from a set of internet of things (IoT) devices operating various parking areas and parking area statistics,
         selecting a top-ranked parking area from the set of available parking areas based at least in part upon user preferences,
         presenting the top-ranked parking area in response to the requested available parking area, and
         determining that the vehicle has come within a predetermined threshold distance of the top-ranked parking area;
      responsive to the determination that the vehicle is within a predetermined threshold distance of the top-ranked parking area, switching a mode of communications between the server and the device of the user to online mode, with online mode being a mode of data communication where online communication is continuous, and
      communicating in online mode, from the server, over the communication network and to the device of the user, route information helpful in travelling from a current position of the vehicle to the top-ranked parking area.

8. The computer system of claim 7, wherein the computer code further includes instructions for causing the processor(s) set to perform the following operation(s):
   communicating in online mode, from the server, over the communication network and to the device of the user, availability of the top-ranked parking area after the vehicle is within the predetermined threshold distance of the top-ranked parking area.

9. The computer system of claim 7 wherein the user preference is walking distance between a given parking area and the travel destination.

* * * * *